INVENTOR:
GEORGE B. LUKENS II,
BY James J. Williams
HIS ATTORNEY.

INVENTOR:
GEORGE B. LUKENS II,
BY James G. Williams
HIS ATTORNEY.

United States Patent Office 3,325,633
Patented June 13, 1967

3,325,633
NUMERICAL CONTROL SYSTEM TO KEEP OBJECT POSITION WITHIN PREDETERMINED RANGE
George B. Lukens II, Waynesboro, Va., assignor to General Electric Company, a corporation of New York
Filed July 24, 1963, Ser. No. 297,412
8 Claims. (Cl. 235—151.11)

The invention relates to an error limiting circuit for numerical control systems, and particularly to such an error limiting circuit for keeping the position of an object actually produced by the control system within a predetermined range of the position of the object commanded by the control system.

Numerical control systems are presently capable of operating machine tools in contouring (or shaping) functions in one, two, or three dimensions. One such control system is a numerical contouring control system in which numerical information continuously directs the relative motion or motions of a machine tool and a workpiece. One such numerical contouring control system is described and illustrated in a co-pending application entitled "Automatic Control Apparatus," filed in the name of L. U. C. Kelling on Sept. 5, 1961, Ser. No. 136,420, now Patent No. 3,226,649 dated Dec. 25, 1965. When a machine tool is contouring a workpiece in response to such a control system, it is desirable to keep the actual relative position of the machine tool and workpiece within a predetermined range of the commanded relative position of the machine tool and workpiece as called for by the control system. Keeping the actual relative position within the predetermined range is desirable because the running error is kept small and, from a practical standpoint, less hardware is required.

Accordingly, an object of the invention is to provide an improved numerical control system.

Another object of the invention is to provide a numerical control system that keeps the actual position of an object within a predetermined range of the object position commanded by the numerical control system.

Another object of the invention is to provide an improved numerical contouring control system that maintains the actual relative position of a machine tool and workpiece within a predetermined distance of the commanded relative position of the machine tool and workpiece along one or more axes of motion.

The invention is intended to be used with a numerical control system in which a system velocity command produces pulses. These pulses have a rate indicative of the desired velocity of operation. The system includes a phase discriminator that compares the phase of signals indicative of the actual position of an object with the phase of signals which are derived from the pulses and which are indicative of the commanded position of the object. The discriminator produces output signals indicative of the phase relation of the compared signals and further indicative of predetermined differences between the actual object position and the commanded object position. These output signals are utilized by the control system to effect or bring about the desired object motion. In accordance with the invention, a detector is coupled to the system discriminator for producing permissive signals in response to those output signals which are indicative of differences, below a predetermined value, between the actual object position and the commanded object position. The detector also produces blocking signals in response to those output signals which are indicative of differences, above a predetermined value, between the actual object position and the commanded object position. These permissive and blocking signals may be coupled to the system velocity command. As long as the actual object position is within the predetermined value or distance of the commanded object position, the velocity command is permitted to produce pulses in response to the permissive signals so that the control system may operate normally. But if the actual object position differs from the commanded object position by more than the predetermined value or distance, the velocity command is blocked in response to the blocking signals so that it cannot produce pulses. This stops or blocks further command pulses until the actual object position is within the predetermined value or distance of the commanded object position again.

The invention is particularly pointed out in the claims. The invention may be better understood from the following description given in connection with the accompanying drawing, in which:

In the specification, a description will first be given of a numerical contouring control system. Then, a description will be given of the error limiting circuit of the invention as used with such a numerical contouring control system.

Numerical contouring control system

Figure 1:
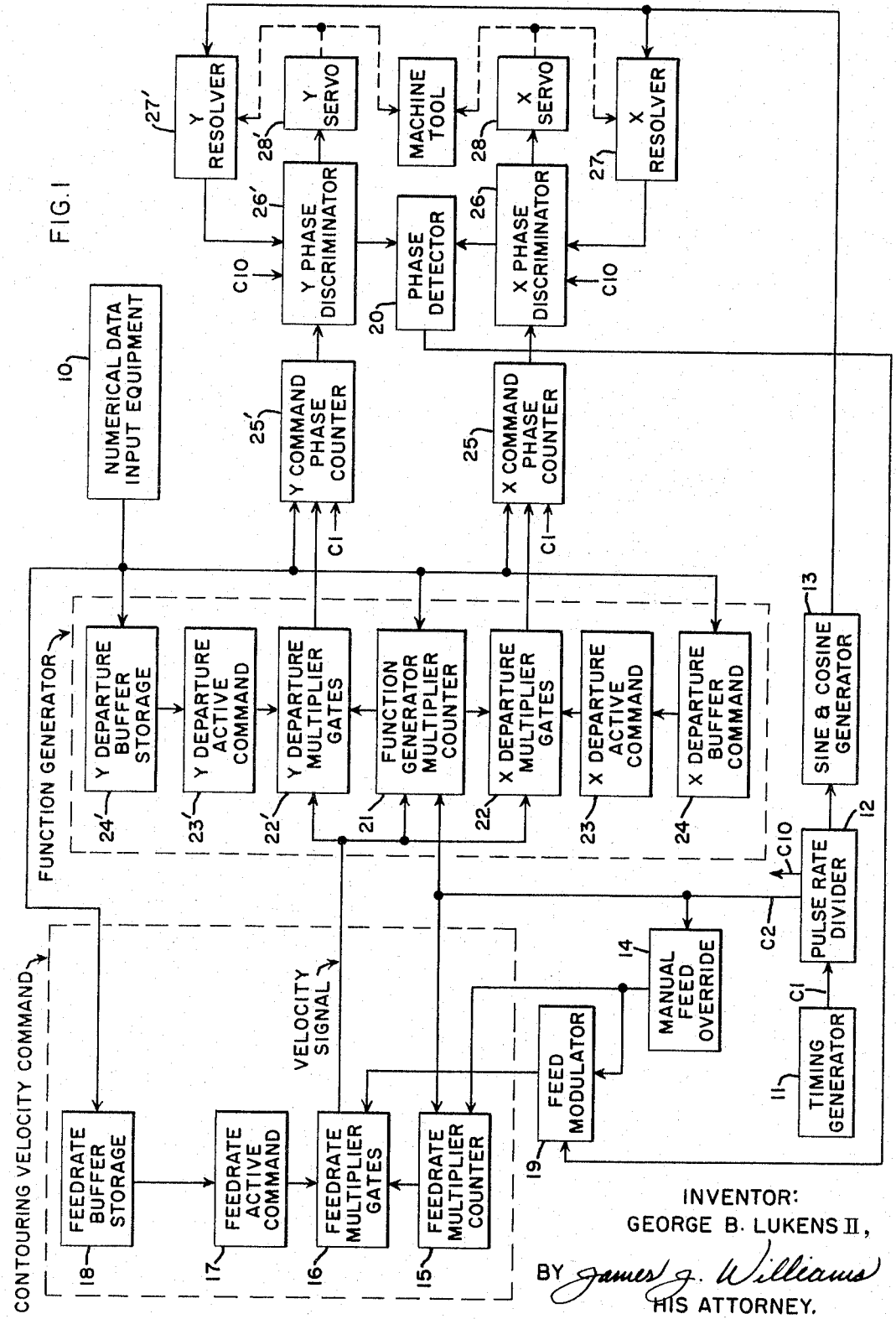
FIGURE 1 shows a block diagram of a numerical contouring control system and the error limiting circuit of the invention.

FIGURE 1 shows a block diagram of a numerical contouring control system and the error limiting circuit of the invention. While the error limiting circuit of the invention may be used with numerical positioning control systems, it is more applicable for use with numerical contouring control systems. The numerical contouring control system shown in FIGURE 1 is known in the art. This system provides an X axis of motion and a Y axis of motion of a machine tool (or a workpiece), but more or less axes of motions may be provided. The system shown in FIGURE 1 includes two main portions, an electronic control portion and a servo or operating portion. Both portions of the system are provided with numerical command information from numerical data input equipment 10. This information may be on any suitable medium such as a punched tape, a punched card, or a magnetic tape. Typically, this information indicates the speed of movement of a machine tool, the distance and direction of movement of the machine tool, various functions, and the location at which the information is needed. The equipment 10 reads the command information and the locations at which this information is needed, and generates appropriate electrical signals for controlling the movement of the machine tool. Signals from the input equipment 10 are coupled to various elements or portions of the system. Both portions of the system also utilize pulses by which the command information is transported and indicated in the control portion of the system. These pulses are square-wave pulses which vary between logic 0 (arbitrarily selected as being plus six volts) and logic 1 (arbitrarily selected as being zero volts). The pulses are produced by a pulse timing generator 11 at a C1 rate which typically is 250 kilocycles. (The numerical suffix indicates the divisor of the basic pulse rate.) This C1 rate is divided or reduced by a pulse rate divider 12 which produces pulses at a C2 rate (typically 125 kilocycles), at a C10 rate (25 kilocycles), and at other rates. The divider 12 also supplies pulses to a sine and cosine generator 13 which produces 250-cycle sine and cosine signals for use in the servo portion of the system. Pulses at the C1, C2, C10, and other rates are coupled to the control and servo portions of the system.

In the control portion of the system, pulses from the pulse rate divider 12 are supplied to a manual feed override 14 which enables an operator to manually control the speed of movement of the machine tool by reducing the rate of the pulses to desired rates below the C2 rate. After having their rate so reduced, these pulses from the manual feed override 14 are supplied to a feedrate multiplier counter 15 in the contouring velocity command (which is enclosed in dashed lines). The feedrate multiplier counter 15 counts at the C2 rate but only during the interval that pulses from the manual feed override 14 are supplied. Thus, the contouring velocity command converts the incoming pulse rate from the manual feed override 14 to count in the feedrte multiplier counter 15. The speed of movement (or feedrate number) of the machine tool is commanded by the numerical data input equipment 10. The feedrate number is introduced and stored in a feedrate buffer storage 18, and is then transferred to a feedrate active command 17. The feedrate number is indicated by a condition in the feedrate active command 17. As the feedrate multiplier counter 15 counts at the C2 rate during the interval that pulses from the manual feed override 14 are received, the condition in the feedrate active command 17 determines when the feedrate multiplier gates 16 produce a pulse. The sequence of a number of these pulses from the feedrate multiplier gates 16 is the contouring velocity signal; the rate of these pulses is indicative of the desired speed of machine tool movement.

The contouring velocity signal is supplied to the function generator (which is enclosed in dashed lines) of the system. The function generator resolves the contouring velocity signal into X and Y components as indicated by command information from the numerical data input equipment 10. This information is supplied to X and Y departure buffer storages 24, 24', and is then transferred to X and Y departure active commands 23, 23' as a count or condition. The count or condition in the X and Y departure active commands 23, 23' are compared, by means of the X and Y departure multiplier gates 22, 22', with the count or condition in the multiplier counter 21 as it counts in response to pulses of the contouring velocity signals. Whenever there is a corresponding count or condition, the X and Y departure multiplier gates 22, 22' produce a respective X or Y pulse. A sequence of these pulses is the contouring signal. The rates of these pulses in the sequences are indicative of the respective X and Y axis velocities, and the total number of these pulses in the sequences are indicative of the relative distances traveled along the X and Y axes. These pulses are supplied to respective X and Y command phase counters 25, 25' in the servo portion of the control system.

The servo portion of the system provides movement of the machine tool among the X and Y axes. Corresponding elements in the servo portion have the same reference numerals, the Y element numerals having a prime. This movement is produced by X and Y servos 28, 28' whose mechanical outputs are coupled to the machine tool and to X and Y resolvers 27, 27'. If these resolvers 27, 27' are suitably excited by signals from the sine and cosine generator 13, they provide 250-cycle voltages whos phases are the function of the mechanical angular position of the resolvers. That is, the phase of the voltages produced by the resolvers 27, 27' shifts 360° for each complete revolution of the resolver shaft. The resolvers 27, 27' are connected to their respective servos 28, 28' so that the resolvers 27, 27' respectively rotate one revolution for a travel of 0.1 inch by the machine tool along the X and Y axes. Thus, the X resolver 27 rotates one revolution (and changes the prase of its output voltage by 360°) in response to the machine tool traveling 0.1 inch along the X axis. The same is true for the Y resolver 27 in response to the machine tool traveling 0.1 inch along the Y axis.

The voltages produced by the resolvers 27, 27' are thus position feedback signals. These feedback signals are coupled to X and Y phase discriminators 26, 26' which compare the actual position of the machine tool as indicated by the resolvers 27, 27' with the commanded position of the machine tool as indicated by the signals from the X and Y command phase counters 25, 25'. The command phase counters 25, 25' receive input information, C1 rate pulses, and function generator signals. The command phase counters 25, 25' produce 250-cycle voltages whose phases are varied (i.e., advanced or retarded) in accordance with the input information from the input equipment 10. The X and Y phase discriminators 26, 26' make this comparison on a phase basis, and any difference in phase between the command signals and the feedback signals represents the difference between the commanded position and the actual position. The comparison also indicates whether the phase of the command signals leads the phase of the position signals; or whether the phase of the position signals leads the phase of the command signals. If the command signal phase leads the position signal phase, motion in one direction is indicated; but if the position signal phase leads the command signal phase, motion in the opposite direction is indicated. The phase discriminators 26, 26' each produce error signals which are applied to X and Y servos 28, 28'. These servos 28, 28' effect or bring about the desired movement of the machine tool along the desired path (or along the X and Y axes) until it reaches the desired position.

The numerical contouring control system as thus far described is known in the art. With reference to FIGURE 1, the invention comprises the following elements: A feed modulator 19 and a phase detector 20. The phase detector 20 is provided with signals from the X and Y phase discriminators 26, 26'. As long as the actual position of the machine tool along the X and Y axes is within a predetermined range or distance of the commanded position of the machine tool along the X and Y axes respectively, the phase detector 20 produces a permissive signal. This permissive signal is supplied to the feed modulator 19 which permits pulses from the manual feed override 14 to be supplied to the feedrate multiplier gates 16. The feedrate multiplier gates 16 require these pulses in order to produce the velocity signal. However, if the phase detector 20 detects that the actual position of the machine tool along either the X or the Y axis is beyond a predetermined range or distance from the respective X or Y commanded position of the machine tool, the phase detector 20 produces a blocking signal. This blocking signal is supplied to the feed modulator 19 which blocks the pulses from the manual feed override 14 and prevents these pulses from reaching the feedrate multiplier gates 16. This stops or interrupts the velocity signal, so that no further velocity signals are produced. This enables the control system to bring the actual machine tool position along either or both of the X and Y axes to within the predetermined range or distance of the commanded machine tool position along either or both of the X and Y axes respectively. At this time the velocity signal is again supplied to the function generator.

Figure 2:
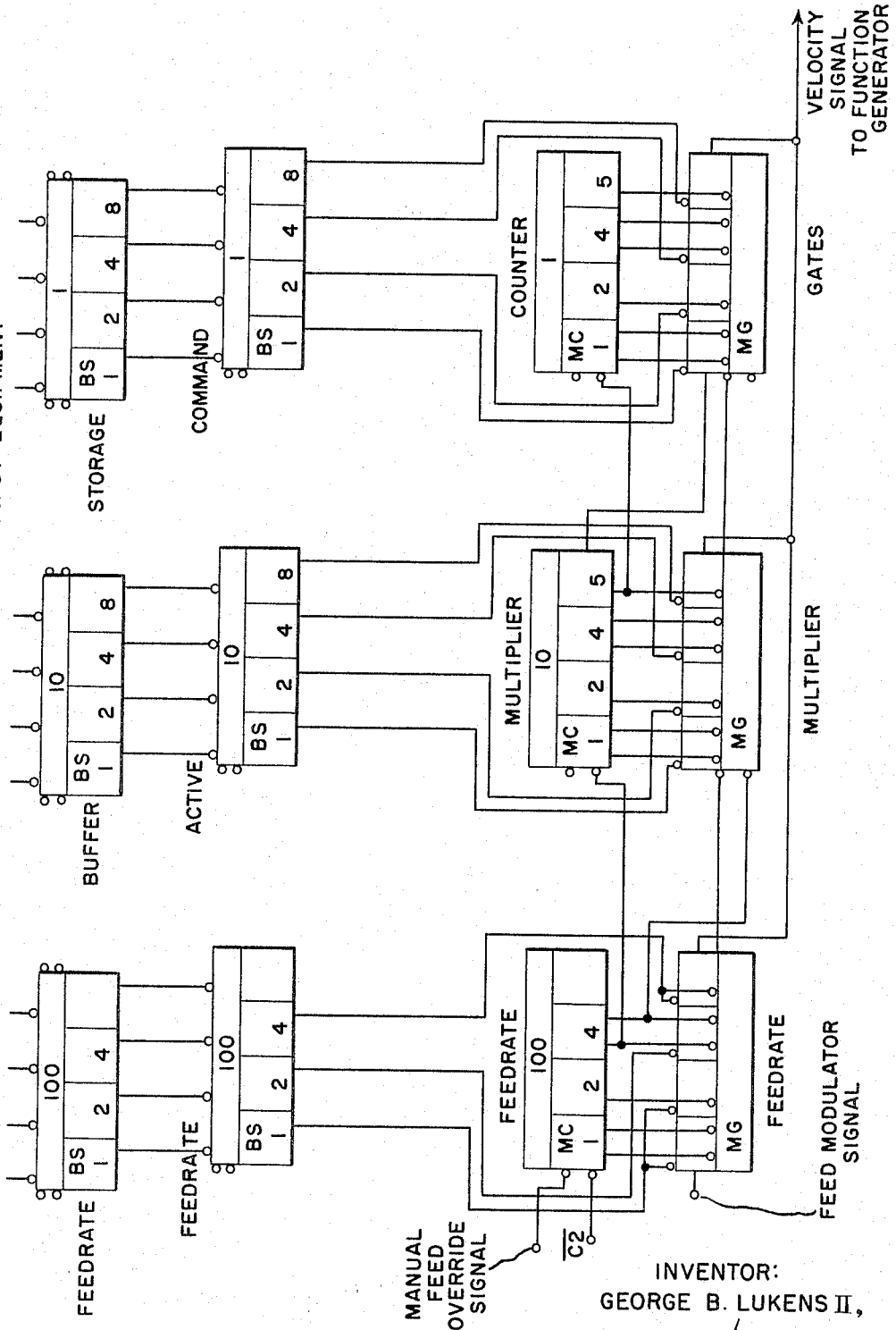
FIGURE 2 shows a more detailed diagram of the velocity command of the numerical control system.

FIGURE 2 shows a more detailed diagram of the contouring velocity command of the numerical control system shown in FIGURE 1, specifically the feedrate buffer storage 18, the feedrate active command 17, the feedrate multiplier counter 15, and the feedrate multiplier gates 16. Each element of the contouring velocity command includes three decades which have magnitudes of 100, 10, and 1 as indicated. Each decade of each element has four flip-flops having the indicated weights. These flip-flops are connected together for the indicated function of storage or counting. Information from the numerical data input equipment is read out and stored in the feedrate buffer storage by appropriate setting of the feedrate buffer storage flip-flops. When needed, this information is transferred into the feedrate active command by appropriate setting of the feedrate active command flip-flops. The information in the feedrate active command is compared with the count in the feedrate multiplier counter. The feedrate multiplier counter counts at the $\overline{C2}$ rate (where the line over C2 indicates the logic inversion of C2) during the interval pulses or signals are received from the manual feed override. In response to the occurrence of selected counts in the feedrate multiplier counter (these selected counts depending on the conditions in the feedrate active command flip-flops), the feedrate multiplier gates produce a velocity signal. But this velocity signal is produced only if the feed modulator signal coupled to the feedrate multiplier gates is permissive (which is a logic 1 in this embodiment). This velocity signal is supplied to the function generator as previously described. The contouring velocity command is common to all axes of operation of the control system, whether there be the X and Y axes of operation shown in FIGURE 1, or whether there be more or less axes of operation.

Figure 3:
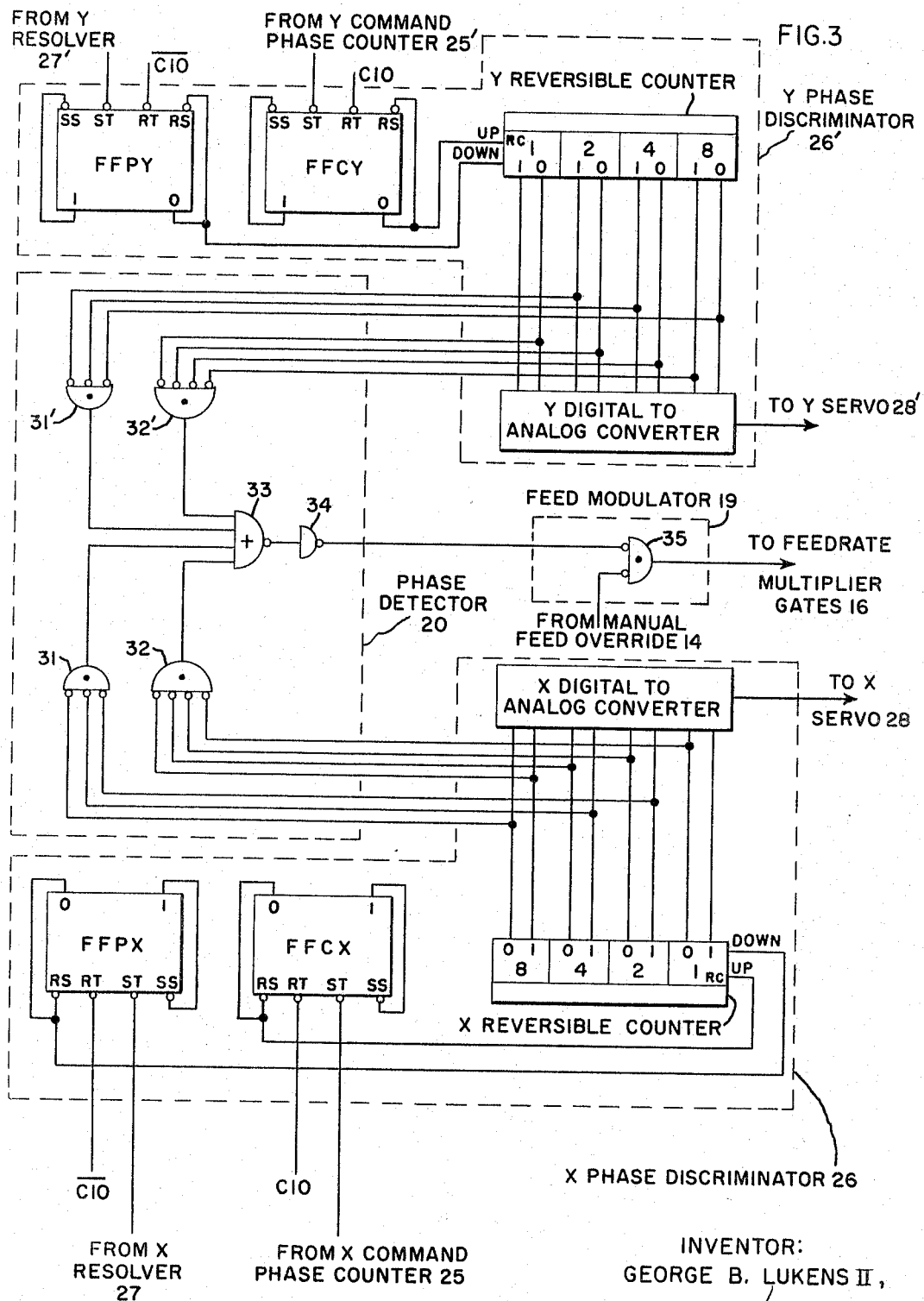
FIGURE 3 shows a more detailed diagram of the phase discriminator of the numerical control system and the error limiting circuit of the invention.

FIGURE 3 shows a more detailed diagram of the X and Y phase discriminators 26, 26′, each discriminator being enclosed in dashed lines. Both of these discriminators are similar in structure and function. Further, additional discriminators would also be similar. Therefore, only the Y phase discriminator 26′ will be described. The discriminator includes a position flip-flop FFPY and a command flip-flop FFCY. These flip-flops FFPY and FFCY have input terminals including a set steering input SS, a set trigger input ST, a reset trigger input RT, and a reset steering input RS; and output terminals 1 and 0. When such a flip-flop is set, it is in the one state with its output terminal 1 at a logic 1 and its output terminal 0 at a logic 0. When such a flip-flop is reset, it is in the zero state with its output terminal 1 at a logic 0 and its output terminal 0 at a logic 1. The flip-flop may be controlled by signals at the input terminals. A logic 0 at the set or reset steering inputs SS or RS for a predetermined time prior to a trigger pulse steers the flip-flop and permits the flip-flop to be respectively set or reset by a trigger pulse change from a logic 1 to a logic 0 at either the set trigger input ST or the reset trigger input RT. A flip-flop remains so set or reset after removal of these signals and until further signals are applied. The discriminator also includes a reversible counter. The reversible counter includes four flip-flops having the indicated weights, this counter being capable of counting either up or down fifteen counts without logic duplication. The reversible counter counts up or down in response to the transition from a logic 0 to a logic 1 at the respective up or down inputs. A count is indicated by the particular flip-flop being set with its output terminal 1 at a logic 1 and its output terminal 0 at a logic 0. If the counter has a count of zero, all its flip-flops are reset (i.e., all of the output terminals 1 are at a logic 0). If an up count of one is received, the one flip-flop becomes set (i.e., its output terminal 1 becomes a logic 1), but the two, four, and eight flip-flops remain reset. An up count of two is indicated by the two flip-flop being set and the other flip-flops being reset. Other up counts are indicated by other set and reset combinations of the flip-flops. But if the counter has a count of zero and a down count of one is received, all of the flip-flops become set (i.e., all of the output terminals 1 are at a logic 1). A down count of two is indicated by the one flip-flop being reset and the other flip-flops being set. Other down counts are indicated by other set and reset combinations of the flip-flops.

The discriminator has been arbitrarily arranged so that each count pulse (i.e., transition from a logic 0 to a logic 1) from the command flip-flop FFCY causes the reversible counter to count up, and each count pulse from the position flip-flop FFPY causes the reversible counter to count down. The control system is arranged so that if the phases of the command signals (i.e., the time occurrence of the leading edges of the command signals) from the command phase counters lead (i.e., are ahead in time) the phases of the position signals (i.e., the time occurrence of the leading edges of the position signals) from the resolvers, motion in one direction takes place. If the phases of the position signals lead the phases of the command signals, motion in the opposite direction takes place. If the system is opearting so that the actual position is very close to the commanded position, the reversible counter will not achieve a large count in either direction. For example, assume that the counter has a count of zero, that both flip-flops FFPY and FFCY are reset, and that motion in the one direction is taking place. A pulse transition from logic 1 to logic 0 is supplied by the Y command phase counter 25′. The flip-flop FFCY has its output terminal 1 (which is at a logic 0) coupled to its set steering input SS. Thus, when the pulse from the Y command phase counter 23′ is received, the flip-flop FFCY becomes set so that its output terminal 1 becomes a logic 1. The output terminal 0 becomes a logic 0, this providing reset steering at the reset steering input RS. Shortly thereafter, a C10 rate pulse of logic 0 is received at the reset trigger input RT to cause the flip-flop FFCY to become reset. The output terminal 0 returns to a logic 1, this causing an up count of one to be received and indicated in the reversible counter by the one flip-flop becoming set. If the actual position is within a close range of the commanded position, the Y resolver 27′ provides a logic 0 to set the flip-flop FFPY. Shortly thereafter, a $\overline{C10}$ (this being the logic inversion of the C10 pulse) is received to reset the flip-flop FFPY. When the flip-flop FFPY is reset, its output terminal 0 returns to a logic 1, this causing a down count of one to be received and indicated in the reversible counter by the one flip-flop becoming reset. If the position pulse from the Y resolver 27′ had been received first (indicating motion in the opposite direction is taking place), the reversible counter would have counted down by one, this being indicated by all the flip-flops being set. Subsequently, a command pulse would be received to cause the counter to count up by one, this being indicated by all the flip-flops being reset.

It will be appreciated that each pulse of a number of command pulses can be received earlier than each corresponding position pulse so that the counter may gradually count up a number of counts, for example three. Or, the counter may gradually count down a number of counts. The following table indicates the states of the reversible counter flip-flops for various distances between the command and the position when travel is in the one direction and in the opposite direction:

TABLE 1

| Distance Command Leads Position | States of Reversible Counter Flip-Flops | | | |
|---|---|---|---|---|
| | 1 | 2 | 4 | 8 |
| 0 | 0 | 0 | 0 | 0 |
| 0.1 inch | 1 | 0 | 0 | 0 |
| 0.2 inch | 0 | 1 | 0 | 0 |
| 0.3 inch | 1 | 1 | 0 | 0 |
| 0.4 inch | 0 | 0 | 1 | 0 |
| 0.5 inch | 1 | 0 | 1 | 0 |
| 0.6 inch | 0 | 1 | 1 | 0 |
| 0.7 inch | 1 | 1 | 1 | 0 |
| 0.8 inch | 0 | 0 | 0 | 1 |

| Distance Position Leads Command | States of Reversible Counter Flip-Flops | | | |
|---|---|---|---|---|
| | 1 | 2 | 4 | 8 |
| 0 | 0 | 0 | 0 | 0 |
| 0.1 inch | 1 | 1 | 1 | 1 |
| 0.2 inch | 0 | 1 | 1 | 1 |
| 0.3 inch | 1 | 0 | 1 | 1 |
| 0.4 inch | 0 | 0 | 1 | 1 |
| 0.5 inch | 1 | 1 | 0 | 1 |
| 0.6 inch | 0 | 1 | 0 | 1 |
| 0.7 inch | 1 | 0 | 0 | 1 |
| 0.8 inch | 0 | 0 | 0 | 1 |

In this table, a 0 means a flip-flop is reset with its output terminal 1 at a logic 0 and its output terminal 0 at a logic 1, and a 1 means a flip-flop is set with its output terminal 1 at a logic 1 and its output terminal 0 at a logic 0. It will be recalled that the command and position signals occur at approximately a 250-cycle rate. Therefore, one or more of the reversible counter flip-flops are always being set and reset at this 250-cycle rate according to the actual distance. For example, if the command leads the position by 0.62 inch, the two and four flip-flops are set and the eight flip-flop is reset. The one flip-flop is set for 2/10 of a given command phase counter output cycle, and reset for 8/10 of the given command phase counter output cycle. As another example, if the position leads the command by 0.27 inch, the four and eight flip-flops are set. The one flip-flop is set and the two flip-flop is reset for 7/10 of a given command phase counter output cycle, and the one flip-flop is reset and the two flip-flop is set for 3/10 of the given command phase counter output cycle. As another example, if the position leads the command by 0.61 inch, the four flip-flop is reset and the eight flip-flop is set. The one flip-flop is set and the two flip-flop is reset for 1/10 of a given command phase counter output cycle, and the one flip-flop is reset and the two flip-flop is set for 9/10 of the given command phase counter output cycle. This feature provides an accurate indication of the actual distance between the actual position and commanded position of the machine tool.

The outputs of the four flip-flops of the reversible counter are coupled to a digital-to-analog converter. This converter is known in the art, and may include suitable weighting resistors which are coupled into or out of the circuit in response to the reversible counter flip-flops being set or reset respectively. These weighting resistors are supplied with direct current, so that the total amount of current supplied by the digital-to-analog converter depends upon the amount or number of weighting resistors coupled into the circuit by the reversible counter flip-flops. This current may be either positive or negative, depending upon whether the reversible counter has counted up or down. The current has a magnitude indicative of the number of counts up or down. This current is supplied to the servos 28' to effect motion of the machine tool along the Y axis in a direction corresponding to whether the counter has counted up or down, and at a velocity proportional to the current magnitude.

*Error limiting circuit*

The error limiting circuit of the invention includes a phase detector 20 and a feed modulator 19, both of which are shown enclosed in dashed lines in FIGURE 3. In the phase detector 20, the corresponding elements for the X and Y axes have been given the same reference numerals, the Y element numerals having a prime. The phase detector 20 includes multiple input NOR gates 31, 32, 31', 32' which are sometimes referred to as NOT AND gates. These gates 31, 32, 31', 32' produce a logic 0 at their outputs if any of their inputs is at a logic 1; and produce a logic 1 at their outputs if all of their inputs are at a logic 0. The phase detector 20 further includes a multiple input NOR gate 33 which is sometimes referred to as an OR NOT gate. This gate 33 also produces a logic 0 at its output if any one of its inputs is at a logic 1; and produces a logic 1 at its output if all of its inputs are at a logic 0. And finally, the phase detector 20 includes an inverter 34. If a logic 1 is applied, the inverter 34 produces a logic 0, and if a logic 0 is applied, the inverter 34 produces a logic 1. Since the Y axis was previously discussed, the detailed description of the phase detector 20 will again refer to the Y axis. However, the operation of the X axis and its logic circuits is identical. The gate 31' has each of its three inputs respectively coupled to the output terminal 1 of the two and four flip-flops and to the output terminal 0 of the eight flip-flop of the reversible counter. The gate 32' has each of its four inputs respectively coupled to the output terminal 0 of the one, two, and four flip-flops and to the output terminal 1 of the eight flip-flop. The feed modulator 19 is enclosed in dashed lines. This modulator 19 includes a two input NOR gate 35. One input is supplied with pulses from the manual feed override 14, and the other input is coupled to the output of the inverter 34. It will be recalled that the feed modulator signal (pulses) should be a logic 1 to render the multiplier gates operative. When the pulses from the manual feed override 14 are at a logic 0, these pulses are passed through the gate 35 as a logic 1 when the other input (from the inverter 34) is at a logic 0. If the other input is at a logic 1, the gate 35 blocks the pulses.

With reference to Table 1 given previously, at least one of the inputs to the gate 31' will be at a logic 1 for all distance differences from 0 through, but not exceeding, 0.7 inch when the command leads the position, and for all distance differences from 0 through, but not exceeding, 0.6 inch when the position leads the command. The gate 31' therefore produces a logic 0 under these conditions. However, when the position leads the command by some amount exceeding 0.6 inch, the output terminal 1 of the two and four flip-flops and the output terminal 0 of the eight flip-flop all become logic 0. Under these conditions, the gate 31' produces a logic 1. This logic 1 causes the gate 33 to produce a logic 0 which is inverted to a logic 1 by the inverter 34. This logic 1 is supplied to the gate 35 and causes the gate 35 to block pulses from the manual feed override 14. In a similar manner, at least one of the inputs to the gate 32' will be at a logic 1 for all distances from 0 through 0.7 inch when the position leads the command, and for all distances from 0 through, but not exceeding, 0.6 inch when the command leads the position. The gate 32' therefore produces a logic 0 under these conditions. However, when the command leads the position by some amount exceeding 0.6 inch, the output terminal 0 of the one, two, and four flip-flops and the output terminal 1 of the eight flip-flop all become logic 0. The gate 32' therefore produces a logic 1. In the manner just described, this logic 1 causes the gate 35 to block pulses from the manual feed override 14.

Therefore, as long as the distance difference between the command and position is not greater than 0.6 inch, at least one of the inputs to each of the gates 31', 32' (and similarly to the gates 31, 32) will be at a logic 1. Therefore, these gates 31', 32' (and gates 31, 32) all produce a logic 0. The gate 33 produces a logic 1 which is inverted to a logic 0 by the inverter 34. This logic 0, when applied to the gate 35 of the feed modulator 19, makes the gate 35 permissive so that pulses from the manual feed override 14 may be supplied to the feedrate multiplier gates 16. It will thus be seen that as long as the commanded position and the actual position differ from each other by less than a predetermined amount, namely 0.6 inch, the system may continue operating. However, as soon as the distance difference in either direction in either axis exceeds this predetermined amount of 0.6 inch, the multiplier gates 16 and the velocity signals are stopped until the distance difference is again less than the predetermined amount.

Figure 4:
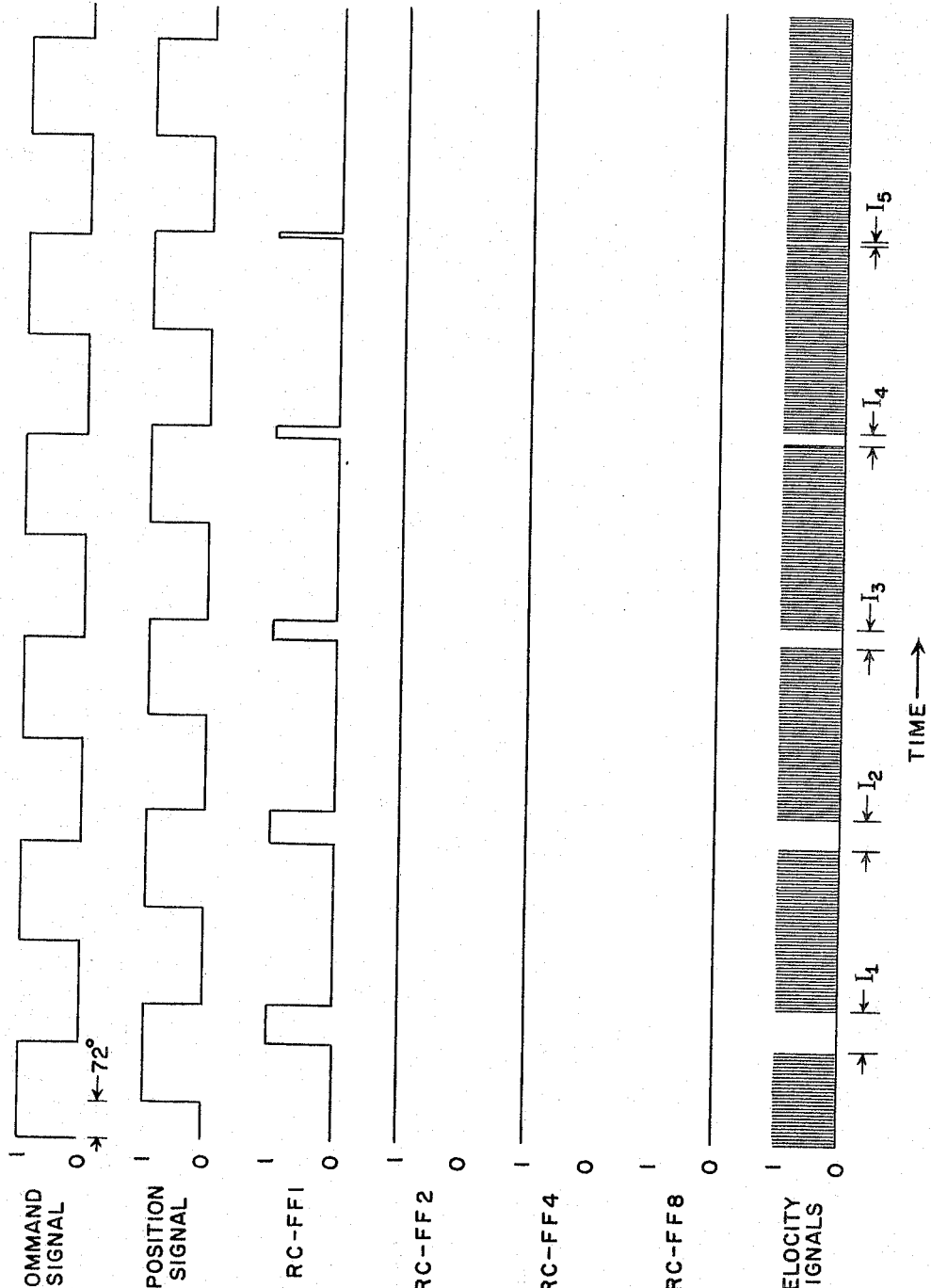
FIGURE 4 shows waveforms for explaining the operation of the error limiting circuit of the invention.

The waveforms of FIGURE 4 illustrate one example of operation of the circuit in the Y axis where the commanded position is ahead of the actual position by 0.62 inch. These waveforms are plotted along a common time axis. The first waveform shows the command signal from a command phase counter. The next waveform shows the signal from the corresponding position feedback resolver. The next four waveforms show the states (i.e., set when at the 1 level and reset when at the 0 level) of the reversible counter flip-flops. And the last waveform shows when system velocity signals are permitted and blocked. It will be recalled that a difference of 0.62 inch is indicated by a phase shift corresponding to 6.2 resolver resolutions, or 2160° plus 72°. Only the 72° phase difference appears in the command and position signals. The 2160° phase difference appears as an up count of six in the two and four flip-flops RC–FF2 and RC–FF4 of the reversible counter. Hence the two and four flip-flops are set, and the eight flip-flop RC–FF8 is reset. The one flip-flop RC–FF1 varies between set and reset. Initially, the one flip-flop is reset. After the command signal returns to a logic 0 to set the flip-flop FFCY, the C10 rate pulse resets the flip-flop FFCY so that an up count is received by the reversible counter. The one flip-flop is set. When the position signal becomes a logic 0, the $\overline{C10}$ rate pulse resets the flip-flop FFPY so that a down count is received by the reversible counter. During this time interval $I_1$ (approximately 72°) when the one flip-flop is set, the phase detector 20 blocks the feed modulator 19 so that no velocity signals are produced. This retards the phase of the command signal to some extent. Subsequent intervals ($I_2$ through $I_5$), when the one flip-flop is set, retard the phase of the command signal until finally the command and position signals are in phase. The one flip-flop then stays reset until the distance difference again exceeds 0.6 inch. It will thus be seen that the commanded velocity is reduced by an amount that is directly proportional to the distance difference that exceeds 0.6 inch. In this way, the commanded velocity may be modulated between 0% and 100%. The error limiting circuit requires no adjustment, so that the control may function up to 100% of the commanded velocity. Furthermore, since the error limiting circuit controls by its slowest axis, all axes are slowed down proportionally and the desired function of the control is still maintained.

While the invention has been shown in a numerical contouring control system, it can be utilized in other systems as well. The invention can be used with any number of axes by the addition of appropriate logic circuits in the phase detector 20. The invention can also be used to limit distance differences to less than 0.6 inch or to more than 0.6 inch by appropriate logic circuitry in the phase detector 20. And, the permissive and blocking signals from the phase detector 20 can be utilized in other parts of the control system to achieve the same function. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In a numerical control system wherein commanded motion of an object is indicated by first pulses indicative of the desired velocity of said object, wherein actual motion of said object is indicated by second pulses indicative of the actual velocity of said object, wherein the relation of said commanded motion to said actual motion of said object is indicated by the phase relation of said first and said second pulses, and wherein said phase relation is indicated by means which respond to an incremental change in said phase relation in one direction and which respond to an incremental change in said phase relation in the opposite direction, an error limiting circuit for limiting the number of said incremental changes comprising: detecting means adapted to be coupled to said phase relation indicating means for detecting a predetermined number of incremental changes in said one direction and for detecting a predetermined number of incremental changes in said opposite direction; and means coupled to said detecting means and adapted to be coupled to said numerical control system for blocking said first pulses in response to the detection of said predetermined number of changes in said one direction and for blocking said first pulses in response to the detection of said predetermined number of changes in said opposite direction.

2. In a numerical control system wherein commanded motion of an object is indicated by first pulses having a rate indicative of the desired velocity of said object, wherein actual motion of said object is indicated by second pulses having a rate indicative of the actual velocity of said object, wherein the distance between said commanded motion and said actual motion of said object is indicated by the phase relation of said first and said second pulses, and wherein said phase relation is indicated by means which respond in one manner to each incremental change in said phase relation in one direction, which respond in an opposite manner to each incremental change in said phase relation in the opposite direction, and which indicate the difference between the number of incremental changes in said one direction and the number of incremental changes in said opposite direction, an error limiting circuit for limiting said difference between the number of said incremental changes in both said directions comprising: detecting means adapted to be coupled to said phase relation indicating means for detecting a predetermined difference between the number of incremental changes in said one direction and the number of incremental changes in said opposite direction; and means coupled to said detecting means and adapted to be coupled to said numerical control system for blocking said first pulses in response to said predetermined difference.

3. In a numerical control system wherein commanded motion of an object is indicated by first pulses having a rate indicative of the desired velocity of said object, wherein actual motion of said object is indicated by second pulses having a rate indicative of the actual velocity of said object, wherein the distance between said commanded motion and said actual motion of said object is indicated by the phase relation of said first and said second pulses, and wherein said phase relation is indicated by a reversible counter which counts up one count in response to each incremental change in said phase relation in one direction and which counts down one count in response to each incremental change in said phase relation in the opposite direction, an error limiting circuit for limiting the distance between said commanded motion and said actual motion comprising: a logic circuit adapted to be coupled to said reversible counter for detecting a predetermined up count and for detecting a predetermined down count; and means coupled to said logical circuit and adapted to be coupled to said numerical control system for blocking said first pulses in response to said predetermined up count and for blocking said first pulses in response to said predetermined down count.

4. The error limiting circuit defined in claim 3 wherein said predetermined up count is numerically equal to said predetermined down count.

5. In a numerical control system for controlling the motion of an object, said system having a controllable portion that produces first pulses having a rate indicative of a desired velocity of operation and having a discriminator that compares first signals indicative of the actual object velocity with second signals indicative of the commanded object velocity and produces output signal indicative of predetermined differences between said first and second signals, a circuit for limiting the difference between the actual object position and the commanded object position comprising: a detector adapted to be coupled to said discriminator for producing permissive signals in response to said output signals indicative of said differences which are less than a predetermined value and for producing blocking signals in response to said output signals indicative of said differences which are more than a predetermined value; and means for coupling said detector to said controllable portion for permitting said controllable portion to produce said pulses in response to said permissive signals and for preventing said controllable portion from producing said pulses in response to said blocking signals.

6. In a numerical control system for controlling the motion of an object, said system having a controllable portion that produces first pulses having a rate indicative of a desired velocity of operation, having a feedback portion that produces second pulses having a rate indicative of actual velocity of operation, and having a discriminator that compares the phase of said first pulses with the phase of said second pulses and produces an up count indicative of predetermined phase increments that said first pulses lead said second pulses and produces a down count indicative of predetermined phase increments that said second pulses lead said first pulses, a circuit for limiting the difference between the actual object position and the commanded object position comprising: a logic circuit adapted to be coupled to said discriminator for producing permissive signals in response to both up and down counts less than a predetermined value and for producing blocking signals alternatively responsive to up and down counts greater than a predetermined value; and means adapted to couple said logic circuit to said controllable portion for permitting said controllable portion to produce said first pulses in response to said permissive signals and for preventing said controllable portion from producing said first pulses in response to said blocking signals.

7. The error limiting circuit defined in claim 6 wherein said predetermined value of up counts is numerically equal to said predetermined value of down counts.

8. In a numerical control system, means for producing first pulses having a rate indicative of the desired velocity of an object, means for producing second pulses having a rate indicative of the actual velocity of said object, a phase detector for measuring the difference between said actual velocity and said commanded velocity comprising means for applying said first and second pulses to said phase detector, said phase measuring means comprising a reversible counter which counts up a predetermined count in response to each incremental change in said phase relation in one direction and which counts down a predetermined count in response to each incremental change in said phase relation in the opposite direction, means for limiting the distance between said commanded motion and said actual motion comprising: a logic circuit adapted to be coupled to said reversible counter for detecting a predetermined up count and for detecting a predetermined down count; and means coupled to said logic circuit and adapted to be coupled to said numerical control system for blocking the application of said first pulses to said phase detector in response to said predetermined up count and for blocking the application of said first pulses to said phase detector in response to said predetermined down count.

References Cited

UNITED STATES PATENTS 3,086,154   4/1963   Lowther et al. __ 235—151.11 X
3,206,663   9/1965   Neal et al. _____ 318—20.110 X MALCOLM A. MORRISON, *Primary Examiner.*

K. W. DOBYNS, M. P. HARTMAN,
*Assistant Examiners.*